United States Patent [19]

Elsner

[11] Patent Number: 4,497,219
[45] Date of Patent: Feb. 5, 1985

[54] PLANETARY GEAR CONTROL SYSTEM WITH RETARDER

[75] Inventor: Ernst Elsner, Herbrechtingen, Fed. Rep. of Germany

[73] Assignee: J. M. Voith GmbH, Heidenheim, Fed. Rep. of Germany

[21] Appl. No.: 408,054

[22] Filed: Aug. 16, 1982

[30] Foreign Application Priority Data

Aug. 29, 1981 [DE] Fed. Rep. of Germany ....... 3134259

[51] Int. Cl.³ .................... F16H 3/44; F16H 57/10
[52] U.S. Cl. ................................... 74/790; 74/786; 74/758; 192/4 B
[58] Field of Search ............... 74/730, 731, 732, 758, 74/773, 774, 786, 790; 192/4 B

[56] References Cited

U.S. PATENT DOCUMENTS

| 2,947,199 | 8/1960 | Doidge et al. | 74/731 X |
| 3,049,945 | 8/1962 | Lindsay | 74/758 X |
| 3,088,339 | 5/1963 | Black | 74/732 X |
| 3,146,630 | 9/1964 | Ivey | 192/4 B |
| 3,181,677 | 5/1965 | Fisher et al. | 192/4 B |
| 4,191,072 | 3/1980 | Ehrlinger et al. | 74/732 |

FOREIGN PATENT DOCUMENTS

| 615366 | 2/1961 | Canada | 192/4 B |
| 1780591 | 7/1970 | Fed. Rep. of Germany | 192/4 B |
| 1926977 | 11/1970 | Fed. Rep. of Germany | 74/730 |
| 2156002 | 5/1973 | Fed. Rep. of Germany | 192/4 B |

Primary Examiner—George H. Krizmanich
Assistant Examiner—Dirk Wright
Attorney, Agent, or Firm—Louis H. Reens

[57] ABSTRACT

A gear system having a plurality of discrete gear ratios includes a retarder connected to a gear component intermediate between an input shaft and an output shaft. The gear component connected to the retarder is coupled to the output shaft with the same relative gear ratio greater than 1 in at least two adjacent ones of the discrete gear ratios of the gear system. The use of a relative gear ratio greater than 1 permits the use of a physically smaller retarder. The use of the same relative gear ratio between the retarder and the output shaft in at least two adjacent gear ratios of the gear system avoid jolts during shifting with the retarder engaged.

9 Claims, 13 Drawing Figures

PLANETARY GEAR CONTROL SYSTEM WITH RETARDER

BACKGROUND OF THE INVENTION

The present invention relates to a planetary gear control system and, more particularly, to a planetary gear control system having a plurality of different selectable gear ratios for the transmission of power between an input and an output. A retarder is engageable at least in some of the gear ratios.

It is desirable for a gear system to permit the speed ratio between input and output to be changed while the gear system is loaded. Preferably, a hydrodynamic torque converter with a bridging coupling is provided between a drive motor and the gear system to facilitate starting from a standstill. The retarder is generally a hydrodynamic brake.

A number of competing parameters complicate the coupling of a retarder to a gear system. First, it is desirable that the retarder be mechanically positioned at a stage in the gear train where speed changes coupled to it are of a continuous nature rather than having rapid discrete jumps. This requirement tends to favor coupling the retarder to the output rather than the input. Second, it is desirable that the retarder be as small as possible. When coupled to the output, the relatively slow output speed in low gears requires a physically large retarder to produce the required torque or moment. Thus, this requirement tends to favor coupling the retarder to the input rather than the output. But, when the retarder is coupled to the input, it is subjected to discrete jumps in speed as the gear ratio is changed. Finally, it is desirable to minimize the thermal and stress loadings on the couplings and brakes employed to change the gear ratio of the gear system.

U.S. Pat. No. 4,191,072 discloses a planetary gear system in which a retarder rotor is permanently connected to the input shaft. At every gear change, the retarder rotor makes the same jump in speed as the drive motor. This produces unpleasant gear-change jolts, particularly when changing between lower gears. Elimination of these jolts requires complicated controls. In addition, when hydrodynamic braking occurs during a gear ratio change, the couplings and/or brakes used to accomplish the changeover are loaded by the braking torque of the retarder.

A publication, VDI-Zeitschrift 1969, pages 333–338 describes a gear system having a retarder rotor connected permanently to the output shaft. This eliminates the retarder-induced jolts when the gear ratio is changed, but it requires a larger retarder since the rotary speed of the retarder rotor is low at low travel speeds and the retarder braking torque is correspondingly reduced. Although additional gears can be provided to drive the retarder at a higher speed, this increases production costs considerably.

U.S. Pat. No. 3,749,209 discloses a gear system in which a hydrodynamic torque converter is relied on for braking rather than a retarder. This arrangement is incapable of providing sufficient retarding torque, particularly in the lower gears.

U.S. Pat. No. 4,077,502 discloses a gear system in which a hydrodynamic torque converter can be employed for braking to a stop. This system requires drive motor input to the gear system during braking.

In a gear system with an integrated retarder, disclosed in German laid-open patent specification No. 25 21 831, part of the gear system forms a step-up gear ratio which drives the retarder rotor from the output shaft. In this system, the gear component which drives the retarder rotor is stationary in at least one forward gear. In some embodiments in this reference, the gear component driving the retarder rotates in a reverse direction in one of the forward gears compared to the direction in another forward gear. This means that the retarder is operable only with the use of a special braking gear. A coupling and/or a brake must be provided to switch the retarder in and out. Such a coupling and/or brake is subjected to substantial stress which causes it to wear out more quickly than would otherwise be the case.

A further disadvantage is that the gear system must be disconnected from the drive motor whenever the retarder is switched in. This means that a braking contribution from the drive motor cannot be used.

OBJECTS AND SUMMARY OF THE INVENTION

It is an object of the invention to provide a gear system having an integrated retarder wherein the gear ratio can be changed while loaded.

It is a further object of the invention to provide a gear system wherein a retarder is operable during gear changes between adjacent gears, preferably lower gears, without a jump in rotary speed applied to the retarder.

It is a further object of the invention to provide a gear system employing a retarder having small physical dimensions which can provide adequate braking torque even at low speeds. At the same time, the changeover elements (couplings or brakes) should be stressed as little as possible during gear changes.

It is a further object of the invention to provide a gear system including a retarder in which couplings and brakes employed for gear ratio changing are subjected to minimum stress and wear during gear changes.

According to an aspect of the present invention, there is provided a gear system of the type having a retarder, comprising an input shaft, an output shaft, at least first, third and fourth gear components between the input shaft and the output shaft, the output shaft being connected to the first gear component, the input shaft being connected to the fourth gear component, means for producing a plurality of different gear ratios in the gear components between the input shaft and the output shaft, the retarder including a rotor and a stator, a connection between the rotor and the third gear component, the means for producing different gear ratios being effective to rotate the rotor in a single direction in all forward gears and further effective to directly connect the third gear component to the input shaft in less than all of the plurality of different gear ratios, gear ratios between the third gear component and the output shaft being equal and greater than 1 in at least two adjacent gear ratios, and gear ratios between the input shaft and the output shaft being different and greater than 1 in the at least two adjacent gear ratios.

In accordance with the present invention, the retarder rotor is permanently connected to neither the input nor the output shaft. Instead, the retarder is connected to an intermediate gear component of a planetary gear system which is connected directly to the input shaft, which always forms the so-called first gear component of the planetary gear system, in only some of the gears. Moreover, the first gear component, the second gear component (to which the high-gear brake appertains) and the third gear component are connected to each other in all operating states in such a way that, by means of gearing elements provided, the planetary gear system produces a high gear ratio, in two adjacent gears, when the high gear brake is closed. Using a high gear ratio in this way drives the retarder rotor at a relatively high speed, thus permitting the use of a retarder having smaller dimensions than would be possible with a direct connection to the output shaft as in referenced publication VD1-Zeitschrift even though it is not as small as can be accomplished with direct connection to the input shaft as in references U.S. Pat. No. 4,191,072. In addition, during gear changeover between the two above-mentioned adjacent gears, the gear ratio between the retarder rotor and the output shaft remains constant. Thus, the retarder is not subjected to a jump in a speed during changes between these gears and jolts are completely eliminated.

The disadvantages of reference German patent specification No. 25 21 831 are overcome in the present invention through the use of a gear system driving the retarder rotor from a gear component rotated in the same direction, at least in all forward gears. This means that, at least in each of the forward gears, and under certain circumstances in a reverse gear as well, the retarder may be switched in or out without requiring the actuation of a coupling or brake. If the retarder is a hydrodynamic retarder, it may be switched in and out in the present invention merely by filling and draining a working fluid respectively.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The use of bar diagrams employed in the descriptions which follow are a well known representation of planetary gear systems. A complete explanation of the use of bar diagrams is to be found in a publication, Automobiltechnische Zeitschrift 1967, pages 149–152, herein incorporated by reference.

Figure 1:
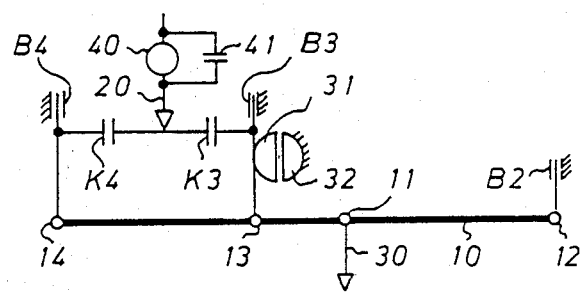
FIG. 1 is a bar diagram to which reference will be made in explaining numerous gear systems according to the invention.

Referring now to FIG. 1, a gear system is represented having four gear components, indicated as the points 11, 12, 13 and 14 on a bar 10. Arrows 20 and 30 indicate input and output shafts respectively. A hydrodynamic torque converter 40 may optionally be connected ahead of the gear system, preferably with a bridging coupling 41. Output shaft 30 is directly connected to first gear component 11.

A retarder 31/32 includes a rotor 31 connected to third gear component 13 and a stator 32 stationarily affixed to the structure. A high-gear brake B2 is arranged on second gear component 12. As used herein, high gear means a high gear ratio which results in a slow speed of output shaft 30. A coupling K3 permits connection of input shaft 20 to third gear component 13. Similarly, a coupling K4 permits connection of input shaft 20 to fourth gear component 14.

A brake B4 may optionally be connected to fourth gear component 14, to provide a fourth forward gear, if desired. If brake B4 is omitted, the gear system will provide three forward gears. A brake B3 on third gear component 13 is optionally provided if a reverse gear is required.

Figure 2:
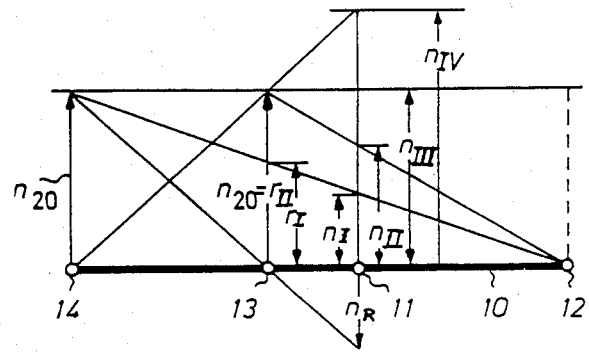
FIG. 2 is a rotary speed diagram related to the bar diagram of FIG. 1.

Referring now also to FIG. 2, bar 10 is again seen with the four gear components 11 to 14 disposed thereon. The upward or vertical direction to the top of the page in FIG. 2 represents increasing speed.

The following paragraphs describe the control of the couplings and brakes in FIG. 1 to achieve four forward gear ratios and a reverse gear. Reference may also be made to FIG. 2 in order to see how the various gear ratios and element speeds are related.

To place the gear system of FIG. 1 into gear I (the highest gear ratio and slowest output shaft speed), coupling K4 and high-gear brake B2 are closed. Coupling K3 and brakes B3 and B4 remain open. Fourth gear component 14 rotates at a speed $n_{20}$ equal to the speed of input shaft 20. Gear component 11 and output shaft 30 rotate at a speed $n_I$ which is the slowest output speed available. Retarder rotor 31 rotates at a speed determined by the gear ratio between gear component 13, to which it is connected, and gear component 11 which is connected to output shaft 30.

To place the gear system of FIG. 1 in gear II, coupling K4 is opened and coupling K3 is closed. High-gear brake B2 remains closed. Third gear component 13 and retarder rotor 31 are connected directly to input shaft 20 and rotate at a speed of $n_{20}$. Output shaft 30 rotates at a speed of $n_{II}$, which is higher than speed $n_I$. However, it should be noted that no change is made in the gear ratio between gear component 13 and output shaft 30. There is, therefore, no sudden jump in the speed of retarder rotor 30 due to this gear change.

To place the gear system of FIG. 1 in gear III, coupling K3 remains closed, high-gear brake B2 is released and coupling K4 is closed. Gear components 11 to 14 all rotate at the speed $n_{20}$ of input shaft 20 which is also equal to the output speed $n_{III}$.

To place the gear system of FIG. 1 in gear IV, coupling K4 is opened and brake B4 is closed. Coupling K3 remains closed. An output speed of $n_{IV}$ is produced, which is higher than the input speed $n_{20}$ of input shaft 20.

To place the gear system of FIG. 1 in reverse gear, coupling K4 and the brake B3 are closed. Output shaft 30 is rotated in the reverse rotary direction at a speed $n_R$.

If it is assumed, for example, that the input speed $n_{20}$ of input shaft 20 corresponds to the maximum speed of the drive motor, then speed $n_I \ldots n_{IV}$ and $n_R$ are the highest speeds of output shaft 30 in gears I, II, III, IV and reverse.

From FIG. 2, it can be seen that in gear I, third gear component 13, and thus also retarder rotor 31, rotates at speed $r_I$. In gear II, speed $r_{II}$ of retarder rotor 31 is equal to $n_{20}$, as already mentioned. Furthermore, the speed ratio $n_{II}/n_I$ of output shaft 30 is equal to the speed ratio $r_{II}/r_I$ at the retarder rotor 31. This means that the ratio between the retarder speed and the output speed is the same in gears I and II ($r_I/n_I = r_{II}/n_{II}$). Thus, when changing from gear I to gear II or vice versa, retarder rotor 31 does not undergo a sudden jump in speed since it is constrained to change in direct proportion to speed changes on output shaft 30. FIG. 2 also shows that, in the gears I and II, the speed of retarder rotor 31 is always greater than the speed of output shaft 30. The gear system thus forms a high gear ratio (translation into a higher speed) for the retarder, so that, despite relatively small dimensions, the retarder can produce a high braking torque down to low travel speed.

In order to achieve this desirable result, the gear system according to FIGS. 1 and 2 requires that gear components 11 to 14 must be arranged on bar 10 in the following manner. First, gear component 11, to which output shaft 30 is connected, must be disposed between second gear component 12, to which the high-gear brake B2 is connected, and third gear component 13, to which retarder rotor 31 is connected. Moreover, high-gear brake B2 must be closed during use of two adjacent gears, such as, for example, gears I and II, so that second gear component 12 is held stationary during use of these gears. Furthermore, first gear component 11 must lie between second gear component 12 and fourth gear component 14. Thus, whenever high-gear brake B2 is closed, the speed of third gear component 13 driving retarder rotor 31 and also the speed of fourth gear component 14 is greater than the speed of first gear component 11 connected to output shaft 30.

In FIGS. 1 and 2, fourth gear component 14 lies at an extreme end of bar 10, placing third gear component 13 between first and fourth gear components 11 and 14. It is also within the contemplation of the present invention to place fourth gear component 14 between first and third gear components 11 and 13.

Figure 3:
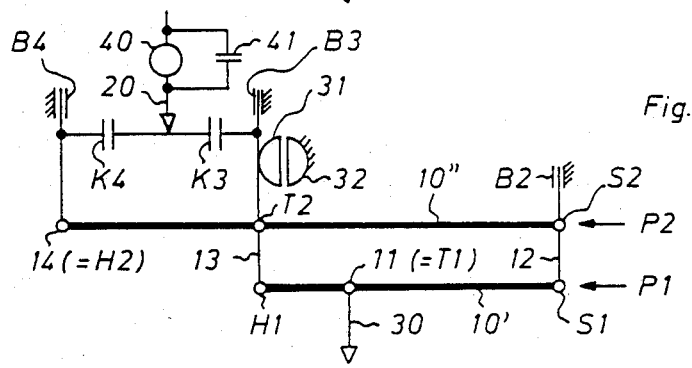
FIG. 3 is a combined bar diagram for a gear system derived from the apparatus in FIGS. 1 and 2, with two sets of planetary wheels.

Referring now to FIG. 3, there is shown an embodiment of the invention derived from FIG. 1. A first bar 10′ represents a first planetary gear set P1. A second bar 10″ in parallel with bar 10′ represents a second planetary gear set P2. Each of planetary gear sets P1, P2 consists of a sun wheel, a satellite carrier, planet wheels on the satellite carrier and an annular wheel.

Figure 4:
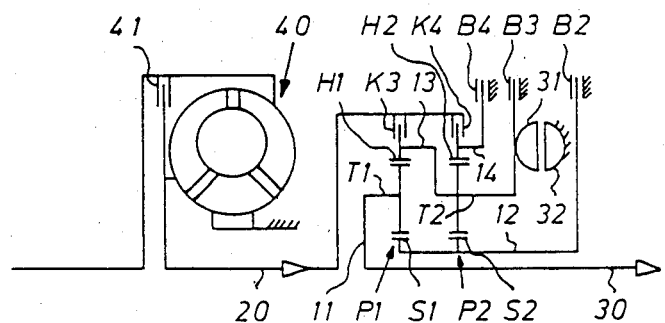
FIG. 4 is a schematic cross sectional view of a gear system according to FIG. 3.

FIG. 4 shows a schematic cross sectional diagram of one possible structural design of a gear system according to FIG. 3. A sun wheel S1, a satellite carrier T1 corresponding to first gear component 11 and an annular wheel H1 comprise first planetary gear set P1. A sun wheel S2, a satellite carrier T2 and an annular wheel H2 corresponding to fourth gear component 14 comprise second planetary gear set P2. Second gear component 12 is a coupling component fixedly connecting sun wheels S1 and S2 for concerted rotation. Similarly, third gear component 13 is a coupling component fixedly connecting annular wheel H1 to satellite carrier T2 for concerted rotation. Apart from this, the same reference numerals are used in FIGS. 3 and 4 as are used in FIGS. 1 and 2.

The embodiments of FIGS. 1–4 provide low frictional and stress loading on the couplings and brakes during operation of retarder 31/32. As an example, assume that operation of the retarder begins at a high travel speed during which gear IV is engaged. Only brake B4 is loaded. High-gear brake B2 and coupling K4 are disengaged and coupling K3, although engaged, is not affected by the retarder torque since torque fed back from output shaft 3 is not transmitted through coupling K3.

When switching from gear IV to gear III, coupling K4 is connected in parallel with coupling K3. Although some of the torque from output shaft 30 can be fed back to retarder rotor 30 through couplings K4 and K3, a good part of the retarder torque is applied directly to retarder rotor 31 from gear component 13 so that less torque is transmitted through couplings K4 and K3 and thus couplings K4 and K3 are relatively lightly stressed.

Since the previous connection of coupling K3 remains unchanged when shifting to gear III, only coupling K4 is subjected to thermal loading during this change. When switching from gear III to gear II, high-gear brake B2 is engaged, thus subjecting it to a certain amount of thermal loading. However, when switching from gear II to gear I, high-gear brake B2 remains engaged without change, and is the only switching element loaded by the retarder. Thus, no thermal loading occurs during this change. Coupling K4 is loaded only with the drag torque of the drive motor.

Similar operation follows when the gear system is shifted into higher gears during operation of the retarder. The gear system is thus appropriate for economical use in commercial vehicles, such as omnibuses, for example.

An additional advantage from the above embodiment lies in the fact that, in the speed range of gear I, a further hydrodynamic braking operation may be provided. This braking operation is achieved by connecting only coupling K4, and filling the retarder with working fluid, brake B2 being released. In this case, during the braking operation, the motor transmits a driving torque into the gear system via coupling K4. Since the motor produces torque even when the vehicle is stationary a hydrodynamic braking torque is exerted on the output shaft until down to the standstill. The braking torque in this case can be controlled by controlling the motor torque. This gear state also provides a hydrodynamic reverse gear with a limited traction rate. If this limited traction rate is sufficient, mechanical locking brake B3 can be dispensed with. In certain cases, reverse gear within the gear system can be omitted altogether. For example, a drive system for a rail vehicle which should reach top speed in both travel directions may employ a separate reversing gear between the gear system and the drive wheels. The retarder is used as described in both travel directions.

Figure 5:
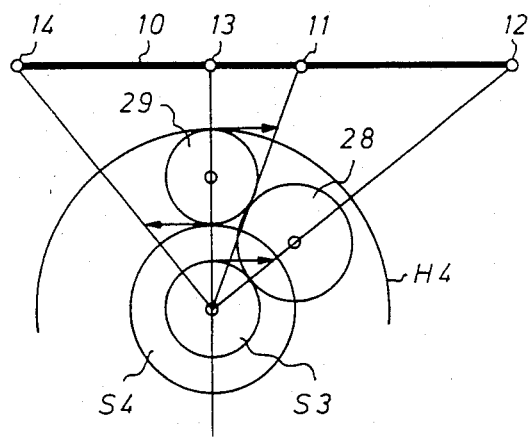
FIG. 5 is a schematic view of a planetary gear system related to a bar diagram which can be derived from FIGS. 1 and 2.
Figure 6:
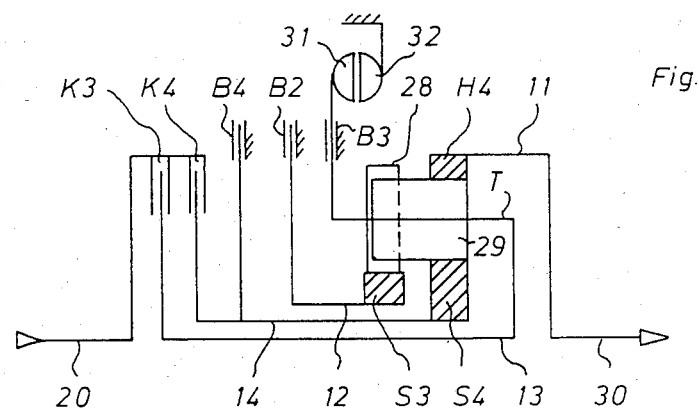
FIG. 6 is a schematic cross sectional view of a gear system according to FIG. 5.
Figure 7:
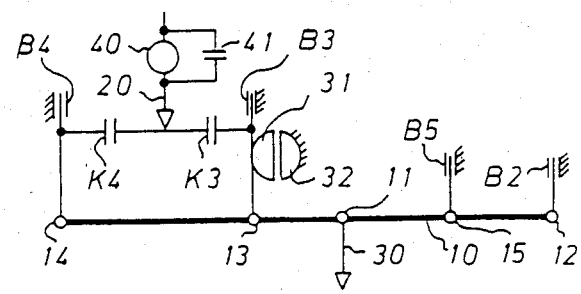
FIG. 7 is a bar diagram of a gear system similar to FIG. 1 including an additional planetary gear for providing a slow gear.

FIGS. 5 and 6 show how another gear system can be derived from the bar 10 in FIGS. 1 and 2. The bar diagram representation of a planetary gear system is according to the previously referenced publication. Two independent concentric sun wheels S3 and S4 have different diameters. Larger sun wheel S4 meshes with planet wheels 29 which are in mesh in the normal way with an annular wheel H4. Smaller sun wheel S3 meshes with planet wheels 28. Planet wheels 28 are long enough to mesh simultaneously with the planet wheels 28. Planet wheels 28 are not meshed with an annular wheel. Annular wheel H4 is the first gear component 11, to which output shaft 30 is connected. Furthermore, smaller sun wheel S3 is second gear component 12. A satellite carrier T, common to the planet wheels 28 and 29, is third gear component 13. Larger sun wheel S4 is fourth gear component 14. Retarder 31/32, brakes B2, B3 and B4 and couplings K3 and K4 are basically linked for operation with gear components 11 to 14 in the same way as in the gear system of FIG. 4.

Figure 8:
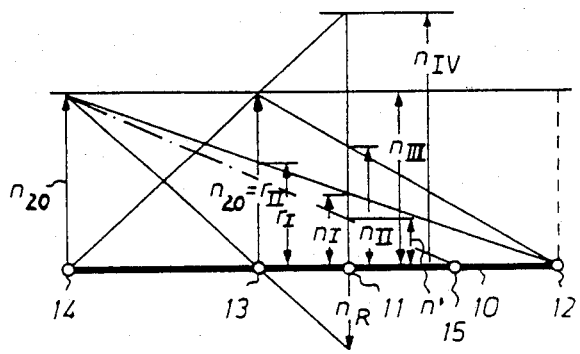
FIG. 8 is a rotary speed diagram related to the bar diagram of FIG. 7.

FIGS. 7 to 10 are similar to FIGS. 1 to 4 except that a further gear component 15 with an additional brake B5 is arranged on bar 10. Gear component 15 is located on bar 10 between first and second gear components 11 and 12. Referring to FIG. 8, when brake B5 is on and coupling K4 is connected, the output shaft rotates at a rotary speed n' which is less than the rotary speed $n_I$. Thus, the gear system in FIGS. 7 to 10 provides five gears. If brake B4 is omitted a gear system with four gears without a high speed gear results. That is, with brake B4 omitted, output shaft 30 rotates in the highest gear at the input speed $n_{20}$.

Figure 9:
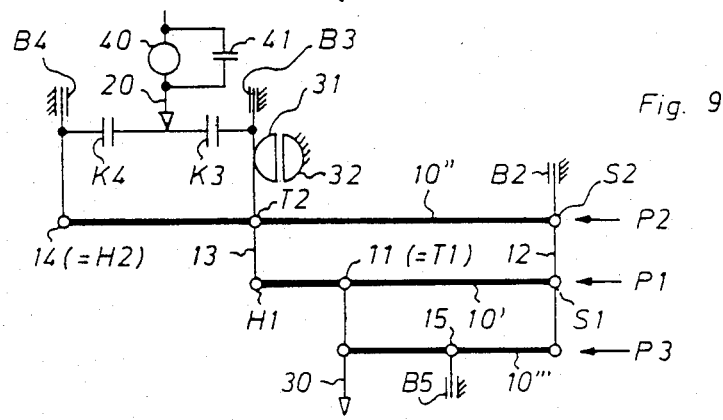
FIG. 9 is a bar diagram of an embodiment of a gear system which can be derived from FIG. 7.
Figure 10:
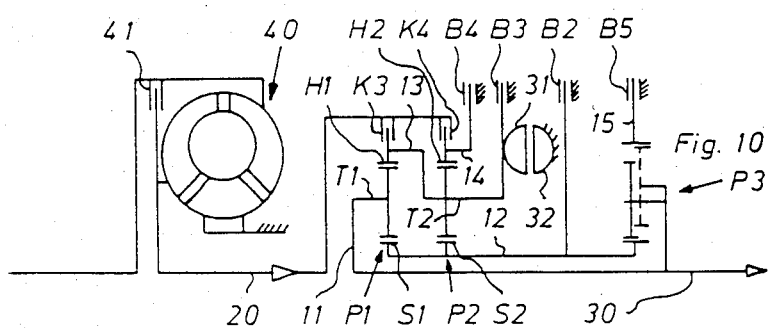
FIG. 10 is a schematic cross sectional view of a gear system of FIG. 9.

The gear system in FIG. 9 is similar to the gear system in FIG. 3 except for the addition of a third parallel bar 10''', which represents a third planetary gear set P3. According to FIG. 10, planetary gear set P3 has double planet wheels, the satellite carrier of which is connected to the output shaft 30. The sun wheel of planetary gear set P3 is connected to second gear component 12. The annular wheel of planetary gear set P3 is fifth gear component 15.

Figure 12:
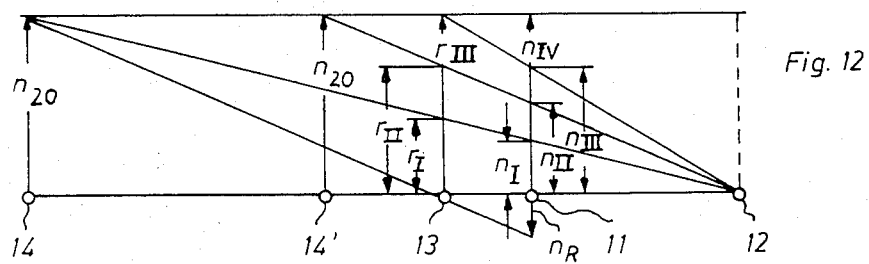
FIG. 12 is a rotary speed diagram related to the embodiment of the invention in FIG. 11.
Figure 13:
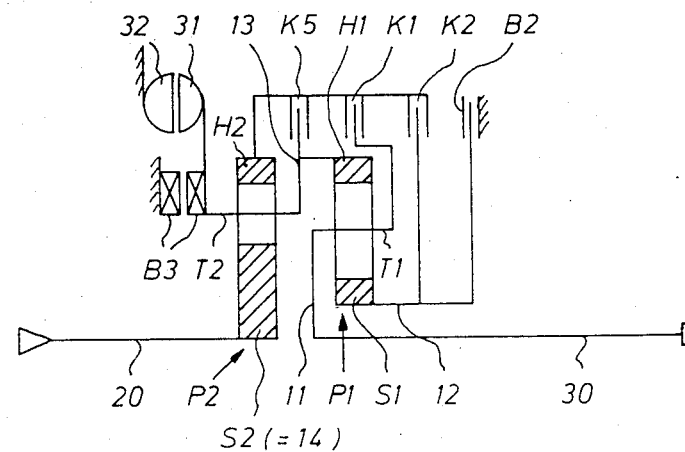
FIG. 13 is a schematic cross sectional view of a gear system according to FIG. 11.

The example described above shows that it is not absolutely essential to lock second gear component 12 in the two lowest gears by means of high gear brake B2 for the gear system to form a high gear for the retarder. On the contrary, two adjacent middle gears may be involved. Moreover, other versions of the gear systems shown are possible, including ones in which high-gear brake B2 is effective in the three lowest gears. An example of this is shown in FIGS. 11 to 13.

Figure 11:
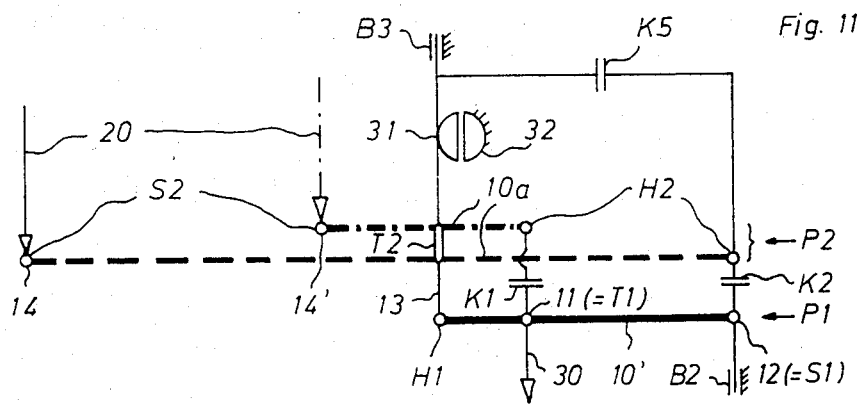
FIG. 11 is a bar diagram of a further embodiment of a gear system in which the three highest gear ratios (three lowest speeds) employ a constant gear ratio between the output shaft and the element driving the retarder rotor.

In FIG. 11, bar 10' can again be seen, representing the planetary gear set P1 corresponding to bar 10' in FIG. 3 and FIG. 9. A bar 10a, representing the planetary gear set P2, is shown with two different sizes, one as a dashed line and the other as a dotted and dashed line. It should be noted that in both cases, the same planetary gear set P2 is involved, comprising a sun wheel S2, satellite carrier T2 and annular wheel H2. In both cases, the ratio between the distance S2-T2 and T2-H2 is the same in FIG. 11. Moreover, in both cases, sun wheel S2 is connected to the same input shaft 20.

This representation results from the fact that, unlike in FIGS. 3 and 9, there is only a single fixed coupling component 13 between the two planetary gear sets P1 and P2. The other coupling is variable or can be released completely. This gives the following five possibilities:

1. Gear I. Coupling K2 connects annular wheel H2 to sun wheel S1. Coupling K1 is released. Fourth gear component 14 lies at the left-hand end of dashed bar 10a (FIG. 11) with input shaft 20 at point 14 (see FIG. 12).

2. Gear II. Coupling K1 connects annular wheel H2 to satellite carrier T1. Coupling K2 is released. Fourth gear component 14' lies at the left-hand end of dotted and dashed bar 10a with input shaft 20 at point 14'.

3. Gear III. Couplings K1 and K2 are opened and K5 is closed. The set P2 of planet wheels revolves as a block so that coupling component 13 revolves at the input speed $n_{20}$.

4. Gear IV. Couplings K1, K2 and K5 are closed. The set P1 of planet wheels also revolves as a block. Output shaft 30 revolves at the speed $n_{IV}=n_{20}$.

5. Reverse gear. Coupling K2 and brake B3 are closed to effect a reverse gear.

As in the other gear systems, the coupling and braking elements described in the preceding may be supplemented by additional switching elements and, if required, one or more additional set of planetary gear sets, in order to increase the available number of gears.

In FIG. 12, the speeds of third gear component 13, to which retarder rotor 31 is connected, are designated $r_I$, $r_{II}$ and $r_{III}$, corresponding to gears I to III. It can be seen that the ratio between the retarder speed and the output speed is the same in all three of these gears, and that this ratio is again greater than +1. Thus, in gears I, II and III, output shaft speed is translated into a higher speed at retarder rotor 31. This gear system is, therefore, particularly suitable for the invention.

A rotary speed diagram similar to that in FIG. 12 can be derived from FIG. 2 by adding a further gear component to the left-hand end. In FIG. 4, a further planetary gear set must be inserted between the input shaft 20 and the couplings K3 and K4 which can be connected to input shaft 20 by means of an additional coupling. Higher gears can be engaged by means of an additional brake. Brake B3 in FIG. 13 is represented as a form-locked brake which can be applied only when the stationary state prevails.

In all the embodiments shown, it is assumed that retarder 31/32 is engaged by filling it with working fluid and disengaged by draining it. In order to make the residual torque produced by air in the drained state as small as possible, conventional air-flow disrupting devices can be used. The retarder may optionally be engaged and disengaged using an additional releasable switching coupling (not shown) for connecting retarder rotor 31 to the third gear component 13.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A gear system of the type having a retarder, comprising:
    an input shaft;
    an output shaft;
    at least first, third and fourth gear components between said input shaft and said output shaft;

said output shaft being connected to said first gear component;

said input shaft being connected to said fourth gear component;

means for producing a plurality of different gear ratios in said gear components between said input shaft and said output shaft;

said retarder including a rotor and a stator;

a permanent connection between said rotor and said third gear component;

said means for producing being effective to rotate said rotor in a single direction in all forward gears;

said means for producing being effective to directly connect said third gear component to said input shaft in less than all of said plurality of different gear ratios;

gear ratios between said third gear component and said output shaft being equal and greater than 1 in at least two adjacent gear ratios; and gear ratios between said input shaft and said output shaft being different and greater than 1 in said at least two adjacent gear ratios;

a second gear component associated with said first, third and fourth gear components, said means for producing including a brake effective to lock said fourth gear component to produce said at least two adjacent gear ratios.

2. A gear system according to claim 1, wherein a gear ratio between said fourth gear component and said third gear component is greater than 1 in one of said at least two adjacent gear ratios.

3. A gear system according to claim 1 or 2, further comprising means for locking the one of said third and fourth gear components having a lower speed ratio when in at least one of said at least two adjacent gear ratios whereby a reverse gear is produced.

4. A gear system according to claim 1, wherein said gear components include;

at least first and second planetary gear sets, each of said planetary gear sets including a sun wheel, a satellite carrier and an annular wheel;

an output shaft connected to said satellite carrier of said first planetary gear set;

said third gear component being at least one coupling component connecting said annular wheel of said first planetary gear set to said satellite carrier of said second planetary gear set;

said rotor being fixed to said at least one coupling component;

a brake actuable to lock said sun wheel of said first planetary gear set to produce said at least two adjacent gear ratios.

5. A gear system according to claim 4, wherein said means for producing includes means for coupling said input shaft selectively to said third gear component or said fourth gear component when said brake is actuated.

6. A gear system according to claim 5, wherein said means for producing further includes a second brake effective to lock the one of said third and fourth gear components having a greater speed in said at least two adjacent gear ratios while the first-mentioned brake is released whereby a higher speed of said output shaft is produced for a given speed of said input shaft.

7. A gear system according to claim 4, wherein said fourth gear component is said sun wheel of said second planetary gear set and said means for producing includes second and third coupling components, said second and third coupling components being alternately actuable to couple said annular wheel of said second planetary gear set to said output shaft and said brake respectively.

8. A gear system according to claim 7, wherein said means for producing includes a fourth coupling component actuable to couple said annular wheel of said second planetary gear set to said third gear component.

9. A gear system according to claim 1, wherein said gear components include a planetary gear set having a sun wheel, a first set of planet wheels meshed with said sun wheel, a first satellite carrier supporting said first set of planet wheels and an annular wheel meshed with said first set of planet wheels, a second set of planet wheels meshed with said sun wheel and said first set of planet wheels and a second satellite carrier supporting said second set of planet wheels.

* * * * *